(12) United States Patent
Wu et al.

(10) Patent No.: US 12,724,174 B2
(45) Date of Patent: Sep. 1, 2026

(54) OPTICAL LENS STRUCTURE COMPRISING AN INK-JETTED OPTICAL MICRO THIN FILM PATTERN FORMED FROM AN INK-JETTED OPTICAL MICRO THIN FILM

(71) Applicant: FORESIGHT OPTICAL LTD., Tainan (TW)

(72) Inventors: Tien-Shu Wu, Tainan (TW); Yen-Ting Wu, Tainan (TW); Yung-Hsien Lu, Tainan (TW)

(73) Assignee: FORESIGHT OPTICAL LTD., Tainan (TW)

( * ) Notice: Subject to any disclaimer, the term of this patent is extended or adjusted under 35 U.S.C. 154(b) by 773 days.

(21) Appl. No.: 17/968,570

(22) Filed: Oct. 18, 2022

(65) Prior Publication Data

US 2024/0077649 A1 Mar. 7, 2024

Related U.S. Application Data

(60) Provisional application No. 63/407,572, filed on Sep. 16, 2022.

(30) Foreign Application Priority Data

Sep. 5, 2022 (TW) ................................. 111133593

(51) Int. Cl.
*G02B 1/00* (2006.01)

(52) U.S. Cl.
CPC .................................. *G02B 1/002* (2013.01)

(58) Field of Classification Search
CPC ..................................................... G02B 1/002
See application file for complete search history.

(56) References Cited

U.S. PATENT DOCUMENTS 4,793,703 A 12/1988 Fretz, Jr.
5,116,684 A 5/1992 Fretz, Jr.
10,259,744 B2 4/2019 Glöge
2015/0049303 A1 2/2015 Chang et al.
2015/0277146 A1* 10/2015 Crespo Vázquez ..........................
B29D 11/00009
264/1.36

FOREIGN PATENT DOCUMENTS

JP 2011106064 A * 6/2011 ........... C09B 69/101

* cited by examiner

*Primary Examiner* — Paul C Lee
(74) *Attorney, Agent, or Firm* — Che-Yang Chen; Law Office of Michael Chen

(57) ABSTRACT

An optical lens structure includes an optical substrate, a predetermined processing area, an optical micro thin film and a micro thin film pattern. The optical substrate has a first surface and a second surface and rays of light passes through the optical substrate. The predetermined processing area is provided on the first surface or the second surface of the optical substrate. The micro thin optical film is formed on the predetermined processing area of the first surface or the second surface by non-contact processing with an ink liquid spot material via nozzles. The micro thin film pattern is formed from the micro thin optical film to thereby provide an optical characteristic.

20 Claims, 3 Drawing Sheets

11
10a
21
2
12
1

11
10
21b
21a
2
12
1

21a
21b
2
1

11
21
2
12
1

11
21
2
12
1

OPTICAL LENS STRUCTURE COMPRISING AN INK-JETTED OPTICAL MICRO THIN FILM PATTERN FORMED FROM AN INK-JETTED OPTICAL MICRO THIN FILM

CROSS REFERENCE TO RELATED APPLICATIONS

This application claims priority to and benefit of U.S. provisional patent application Ser. No. 63/407,572, filed Sep. 16, 2022, which is hereby incorporated by reference in its entirety.

BACKGROUND OF THE INVENTION

1. Field of the Invention

The present invention relates to an optical lens structure having at least one optical micro thin film (i.e., optical micro-thickness thin film) to form an optical pattern or a color design. Particularly, the present invention relates to the optical lens structure having a surface (e.g., front surface or rear surface) on which to provide at least one optical micro-scale thin film to form an optical pattern or a color design.

2. Description of the Related Art

U.S. Pat. No. 10,259,744, entitled "Process for producing an optical glass with an anti-fog coating," discloses an anti-fog optical glass structure with comprising a main glass body, a front surface glass layer, an anti-fog coating layer and a rear surface glass layer.

Furthermore, the anti-fog coating layer is formed on the front surface glass layer of the main glass body for reducing or minimizing contact angles of water droplets adhering to thereto, thereby further avoiding moisture mist or fog forming on the front surface glass layer of the main glass body.

Another U.S. Pat. No. 5,116,684, entitled "Composite ophthalmic lens," discloses a composite optical lens structure with comprising an inorganic glass layer, a rigid organic plastic layer and a plurality of silicon gaskets, with the rigid organic plastic layer made of an optically clear, epoxy polymer cast.

Furthermore, the optically clear, epoxy polymer cast is made from an aliphatic and/or aromatic epoxide monomer, a curing agent, a source of active hydroxyl groups and an accelerator, and has a predetermined refractive index. The ratio of curing agent to epoxide, by equivalent weights, is between 2:5 and 5:4, the ratio of curing agent to hydroxyl group source, by equivalent weights, is between 2:1 and 6:1, and the amount of accelerator is at least 0.01%, but not over 1.0%.

However, the composite optical lens structure is only formed from the combination of inorganic glass layer, rigid organic plastic layer and silicon gaskets, with obviously whichever two members of the combination not providing any optical functional thin film therebetween.

Another U.S. Pat. No. 4,793,703, entitled "Laminated glass lenses," discloses a first laminated glass lens structure with comprising an inorganic glass layer, an organic plastic layer and an adhesive layer bonded therebetween to form a laminated structure.

Furthermore, the inorganic glass layer is formed as a glass front surface layer (i.e., thin inorganic layer) while the organic plastic layer is formed as a plastic back surface layer (i.e., rear surface layer). The adhesive layer can be selected from an organic adhesive material which can be cured at room temperature.

However, the first laminated glass lenses structure is only formed from the combination of inorganic glass layer, organic plastic layer and organic adhesive layer bonded therebetween, with obviously no optical functional thin film providing between the inorganic glass layer and the organic plastic layer.

As mentioned above, U.S. Pat. No. 4,793,703 further discloses a second laminated glass lens structure with comprising an inorganic glass layer, a first organic plastic layer, a second organic plastic layer, a first adhesive layer and a second adhesive layer.

However, the second laminated glass lenses structure is only formed from the combination of inorganic glass layer, first organic plastic layer, second organic plastic layer, first adhesive layer and second adhesive layer, with obviously no optical functional thin film providing between the inorganic glass layer and the first organic plastic layer or the inorganic glass layer and the second organic plastic layer.

Another U.S. Patent Application Publication No. 2015/0049303, entitled "Photochromic Composite Lens," discloses a photochromic composite lens structure with comprising a front lens layer, a rear lens layer, a transition layer and functional coating layers, with providing a supporting mechanism between the front lens layer and the rear lens layer to form the transition layer.

The front lens layer is relatively arranged at a front side while the rear lens layer is relatively arranged at a rear side. In addition, the transition layer is selected from a photochromic layer including a photochromic material. Provided between the front lens layer and the rear lens layer is a uniform space which is spaced apart by the supporting mechanism so as to produce a uniform thickness of photochromic layer.

The front lens layer has a front side surface on which to selectively coat a functional coating layer while the rear lens layer has a rear side surface on which to selectively coat another functional coating layer which may be similar to or different from one coated on the front side surface of the front lens layer.

However, the above-mentioned lens structures do not have an optical micro thin film (i.e., optical micro-thickness thin film) such that they cannot possibly provide an optical pattern or a color design of micro-thickness thin film on lens devices or further successfully modified to provide an optical pattern or a color design of micro-thickness thin film on lens devices.

However, there is a need of improving the conventional lens structure for providing an optical pattern or a color design of micro-thickness thin film thereon. The above-mentioned patents and patent application publications are incorporated herein by reference for purposes including, but not limited to, indicating the background of the present invention and illustrating the situation of the art.

SUMMARY OF THE INVENTION

The primary objective of this invention is to provide an optical lens structure having at least one optical micro thin film (i.e., optical micro-thickness thin film) to form an optical pattern or a color design and manufacturing method thereof. A first surface and a second surface are provided on an optical substrate, with contactless forming at least one optical micro thin film with an ink droplet material processed by an ink-jetting nozzle procedure on the first surface or the second surface. The optical micro thin film can be designed to form a predetermined micro thin film pattern or a predetermined color change distribution mark or pattern of micro thin film. Advantageously, the optical lens structure of the present invention is successful in providing a designed pattern or a designed color change distribution mark of optical micro thin films.

The optical lens structure in accordance with an aspect of the present invention includes:

- an optical substrate having a first surface and a second surface, with rays or a beam of light capable of penetrating through the first and second surfaces of the optical substrate;
- at least one predetermined processing area provided on the first surface or the second surface of the optical substrate;
- at least one optical micro thin film contactless formed with an ink droplet material processed by an ink jetting nozzle procedure on the predetermined processing area of the first surface or the second surface of the optical substrate; and
- at least one predetermined micro thin film pattern formed from the at least one optical micro thin film to thereby provide an optical characteristic on the first surface or the second surface of the optical substrate.

In a separate aspect of the present invention, the optical substrate has a first refractive index and the optical micro thin film has a second refractive index relatively different from the first refractive index of the optical substrate.

In a further separate aspect of the present invention, the first surface or the second surface of the optical substrate is selected from an irregularity surface, a curved surface, a wavy surface or combinations thereof.

In yet a further separate aspect of the present invention, the optical micro thin film has a predetermined thickness ranging between 0.5 μm and 3.0 μm.

In yet a further separate aspect of the present invention, the optical micro thin film comprises a plurality of micro thin films which are combined to form a composite micro thin film.

The optical lens structure in accordance with another aspect of the present invention includes:

- an optical substrate having a first surface and a second surface, with rays or a beam of light capable of penetrating through the first and second surfaces of the optical substrate;
- at least one predetermined processing area provided on the first surface or the second surface of the optical substrate;
- at least one optical micro thin film contactless formed with an ink droplet material processed by an ink jetting nozzle procedure on the predetermined processing area of the first surface or the second surface of the optical substrate; and
- at least one predetermined color change distribution mark formed from the at least one optical micro thin film to thereby provide an optical characteristic on the first surface or the second surface of the optical substrate.

In a separate aspect of the present invention, the ink droplet material includes a plurality of dye materials which are continuously distributed to form the predetermined color change distribution mark.

In a further separate aspect of the present invention, the ink droplet material is processed to have various concentrations which are continuously distributed to form the predetermined color change distribution mark.

In yet a further separate aspect of the present invention, the predetermined color change distribution mark is selected from a predetermined pattern, a predetermined symbol, a predetermined character, a predetermined number or combinations thereof.

In yet a further separate aspect of the present invention, the predetermined color change distribution mark is continuously formed with various thicknesses.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an optical lens structure having at least one optical micro thin film (i.e., optical micro-thickness thin film) to form an optical pattern or a color design and manufacturing method thereof in accordance with the preferred embodiment of the present invention can be applicable to various glasses (including rimless glasses), various sunglasses, various smart glasses, various sport glasses (including motorcycle-riding glasses), various goggles, various 3D glasses devices, various VR wearable glasses devices, various AR wearable glasses devices or other optical devices such as sensor lens devices, camera lens devices, computer display glasses or TV screen glasses, which are not limitative of the present invention.

Figure 1:
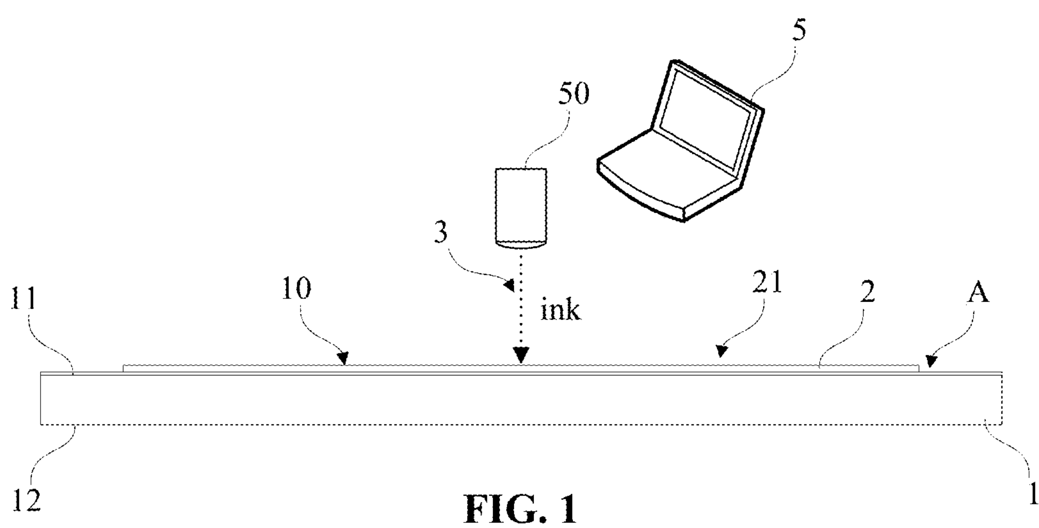
FIG. 1 is a schematic side view of an optical lens structure having an optical micro thin film to form an optical pattern or a color design in accordance with a first preferred embodiment of the present invention.

FIG. 1 shows a schematic side view of an optical lens structure having an optical micro thin film to form an optical pattern or a color design in accordance with a first preferred embodiment of the present invention. Referring now to FIG. 1, the optical lens structure in accordance with the first preferred embodiment of the present invention includes an optical substrate 1, a predetermined processing area 10, at least one optical micro thin film 2 and at least one predetermined micro thin film pattern 21.

With continued reference to FIG. 1, by way of example, the optical substrate 1 is selected from a single-layer optical substrate or a multiple-complex-layer optical substrate, with the optical substrate 1 having a uniform thickness selectively made of a glass material, a plastic material, an eco-friendly plastic material, a macromolecule material, a PC (polycarbonate) material, a PMMA (poly(methyl methacrylate)) material, a nylon material or similar materials.

Still referring to FIG. 1, by way of example, the optical substrate 1 is selected from an optical polarization layer, an anti-reflection layer, a photochromic material layer, an anti-blue layer, an anti-blue UV layer, an anti-infrared layer or other functional layer (e.g., anti-fog layer or scratch resistant layer) or combinations thereof.

Still referring to FIG. 1, by way of example, the optical substrate 1 is selected from various corrective glasses (e.g., nearsightedness glasses, farsightedness glasses, cylinder (CYL) correction glasses, reading (presbyopia) glasses, combinations thereof or other glasses having a corrective function).

With continue reference to FIG. 1, by way of example, a manufacturing method of an optical lens structure includes: providing a first surface 11 and a second surface 12 on the optical substrate 1 through which rays or a beam of light can be penetrated. In use, the first surface 11 is relatively located at an outer side (i.e., front side) while the second surface 12 is relatively located at an inner side (i.e., rear side). The first surface 11 or the second surface 12 of the optical substrate 1 is selected from an irregularity surface, a curved surface, a wavy surface or combinations thereof.

Still referring to FIG. 1, by way of example, the manufacturing method of the optical lens structure includes: providing the predetermined processing area 10 on the first surface 11 or the second surface 12 of the optical substrate 1. The predetermined processing area 10 of the optical substrate 1 is selected from a peripheral area surface, a peripheral edge surface, a central area surface, a side rim area surface, a protrusion curved surface, a recession curved surface or combinations thereof.

Still referring to FIG. 1, by way of example, the predetermined processing area 10, the first surface 11 or the second surface 12 of the optical substrate 1 is processed by a pretreatment procedure (e.g., cleaning process, dust-removing process, static-eliminating process or other auto or semi-auto treatment process).

Still referring to FIG. 1, by way of example, the predetermined processing area 10 of the optical substrate 1 is further selectively formed with a primer coat, a hard coat or other equivalent coatings "A" to enhance in fixing the micro thin film pattern 21 and the optical micro thin film 2 or the likes thereon.

Still referring to FIG. 1, by way of example, the optical micro thin film 2 or the micro thin film pattern 21 has a predetermined thickness which may be a uniform thickness, a non-uniform thickness, a continuously varying thickness or a non-continuously varying thickness. The predetermined thickness is ranging between 0.5 μm and 3.0 μm or other thickness scopes.

Still referring to FIG. 1, by way of example, the manufacturing method of the optical lens structure includes: contactless forming the optical micro thin film 2 with jetting an ink droplet material (or ink liquid spot material) 3 in a non-contact precision process (i.e., vapor bubble jetting or piezoelectric micro-needle jetting) on the predetermined processing area 10 of the first surface 11 or the second surface 12 of the optical substrate 1.

Still referring to FIG. 1, by way of example, a processing device has a computer-program control unit 5 and a nozzle device 50 (as best shown at upper portion in FIG. 1). The computer-program control unit 5 is applied to precisely control the nozzle device 50 in jetting the ink droplet material (or ink liquid spot material) 3 to the predetermined processing area 10. The nozzle device 50 has micro-scale dimensions which can provide a suitable dpi (dot per inch) value in ink-jetting operation.

Still referring to FIG. 1, by way of example, the manufacturing method of the optical lens structure includes: automatically forming a predetermined micro thin film pattern 21 from the optical micro thin film 2 to thereby provide an optical characteristic on the first surface 11 or the second surface 12 of the optical substrate 1. For instant, the optical characteristic includes a function of optical polarization, anti-reflection, photochromic filtering, anti-blue light, anti-blue UV light, anti-infrared light or others.

Still referring to FIG. 1, by way of example, the optical substrate 1 has a first refractive index and the optical micro thin film 2 (i.e., ink droplet material or ink liquid spot material) has a second refractive index relatively different from the first refractive index of the optical substrate 1 or substantially similar thereto.

Still referring to FIG. 1, by way of example, the ink droplet material (or ink liquid spot material) 3 comprises a predetermined-concentration dye material, a predetermined-concentration additive, a predetermined-concentration resin material (e.g. color resin), a predetermined-concentration solvent, with selecting the solvent from alcohol ether solvents, with selecting the resin from acrylic or polyurethane (PU), with the ink droplet material (or ink liquid spot material) 3 comprising propylene glycol monobutyl ester or diethylene glycol monobutyl ester.

Figure 1A:
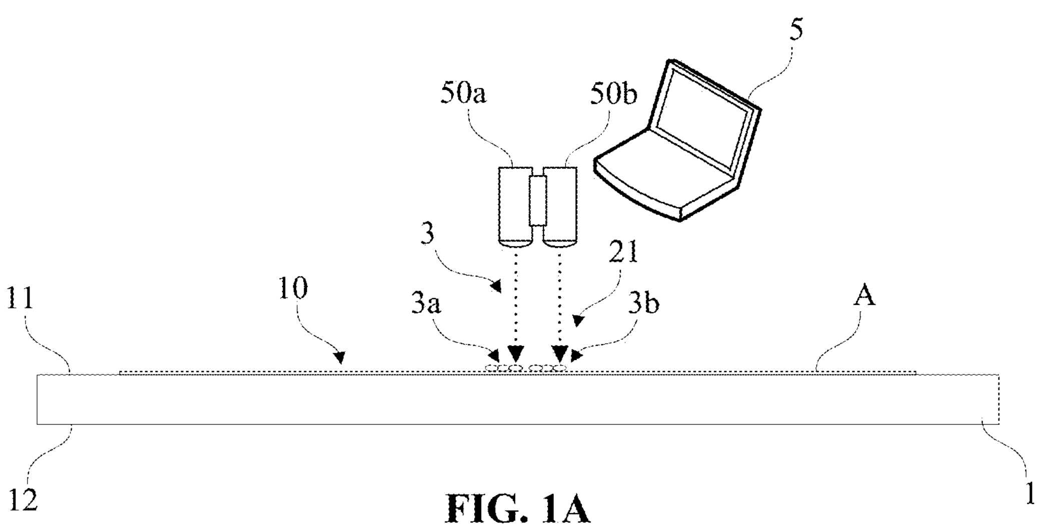
FIG. 1A is a schematic side view of an optical lens structure ink jetting an optical micro thin film to form an optical pattern or a color design in accordance with another preferred embodiment of the present invention.

FIG. 1A shows a schematic side view of an optical lens structure ink-jetting an optical micro thin film to form an optical pattern or a color design in accordance with another preferred embodiment of the present invention. Turning now to FIG. 1A, by way of example, the nozzle device has a first nozzle 50*a* and a second nozzle 50*b* for jetting the ink droplet material (or ink liquid spot material) 3 to controllably form the predetermined micro thin film pattern 21 with arranging a series of micro ink spots one after another.

With continued reference to FIG. 1A, in forming the predetermined micro thin film pattern 21, the first nozzle 50*a* is controllably operated to continuously jet a series of first micro ink droplets 3*a* on the first surface 11 of the optical substrate 1 while the second nozzle 50*b* is controllably operated to continuously jet a series of second micro ink droplets 3*b* on the first surface 11 of the optical substrate 1 adjacent to the series of first micro ink droplets 3*a*.

Still referring to FIG. 1A, by way of example, the series of first micro ink droplets 3*a* have a predetermined dye color and a predetermined concentration different from those of the series of second micro ink droplets 3*b* to form various optical characteristics (e.g., color change design) of the predetermined micro thin film pattern 21. Further, the series of first micro ink droplets 3*a* and the series of second micro ink droplets 3*b* can be controlled to provide a continuous change of thickness of the predetermined micro thin film pattern 21.

Figure 2:
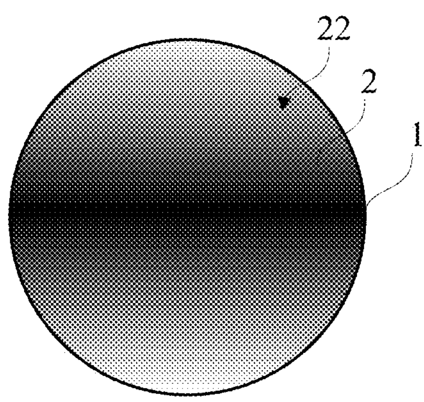
FIG. 2 is a schematic top view of an optical lens structure having an optical micro thin film to form an optical pattern or a color design in accordance with a second preferred embodiment of the present invention.

FIG. 2 shows a schematic top view of an optical lens structure having an optical micro thin film to form an optical pattern or a color design in accordance with a second preferred embodiment of the present invention. Turning now to FIG. 2, by way of example, the optical micro thin film 2 of the second preferred embodiment is processed to form a predetermined color change distribution mark 22 on the first surface 11 of the optical substrate 1 for providing an optical characteristic.

Referring now to FIGS. 1 and 2, by way of example, the predetermined color change distribution mark 22 has at least one dark color section, at least one light color section and at least one color transition section which can be continuously formed and distributed by the nozzle device 50 (as best shown at upper portion in FIG. 1) to provide a change of color design.

Still referring to FIGS. 1, 1A and 2, by way of example, the ink droplet material (or ink liquid spot material) 3 has designed to have various concentrations in various dye colors to form the predetermined color change distribution mark 22. Furthermore, the predetermined color change distribution mark 22 is selected from a predetermined pattern, a predetermined symbol, a predetermined character, a predetermined number or combinations thereof.

Still referring to FIGS. 1, 1A and 2, by way of example, according to design needs, the ink droplet material (or ink liquid spot material) 3 includes a plurality of color dyes which are processed by the nozzle device 50 or the first and second nozzles 50*a*, 50*b* (as best shown at upper portion in FIGS. 1 and 1A) to form the predetermined color change distribution mark 22.

Figures 3, 4, 5, 6, 7:
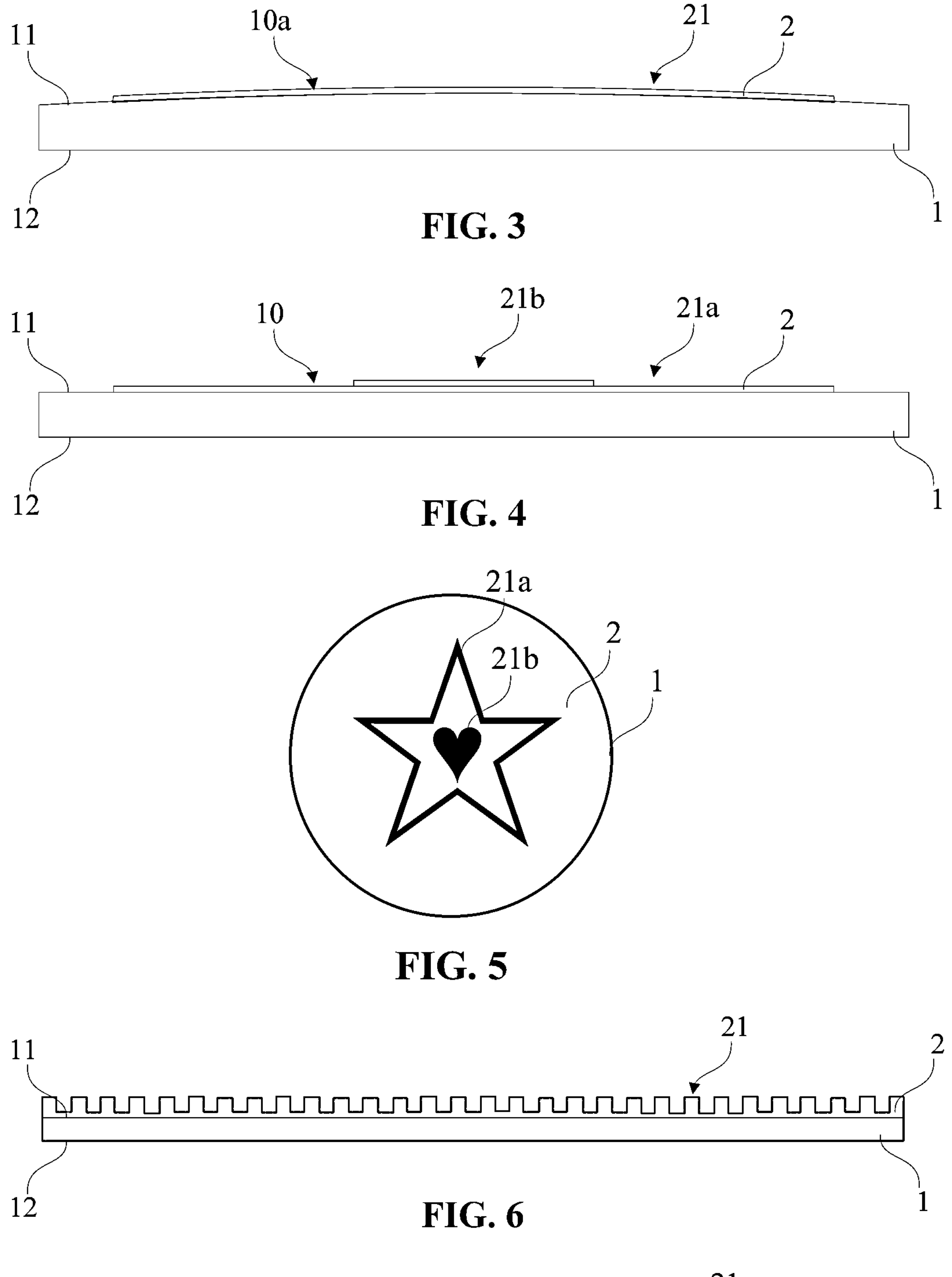
FIG. 3 is a schematic side view of an optical lens structure having an optical micro thin film to form an optical pattern or a color design in accordance with a third preferred embodiment of the present invention.
FIG. 4 is a schematic side view of an optical lens structure having an optical micro thin film to form an optical pattern or a color design in accordance with a fourth preferred embodiment of the present invention.
FIG. 5 is a schematic top view of an optical lens structure having an optical micro thin film to form an optical pattern or a color design in accordance with the fourth preferred embodiment of the present invention.
FIG. 6 is a schematic side view of an optical lens structure having an optical micro thin film to form an optical pattern or a color design in accordance with a fifth preferred embodiment of the present invention.
FIG. 7 is a schematic side view of an optical lens structure having an optical micro thin film to form an optical pattern or a color design in accordance with a sixth preferred embodiment of the present invention.

FIG. 3 shows a schematic side view of an optical lens structure having an optical micro thin film to form an optical pattern or a color design in accordance with a third preferred embodiment of the present invention. Turning now to FIG. 3, in comparison with the first embodiment, the optical substrate 1 of the third preferred embodiment has a predetermined processing area 10*a* which is selected from a curved protrusion surface along which to precisely form a uniform thickness of optical micro thin film 2 by various ink-jetting speeds.

With continued reference to FIG. 3, in another preferred embodiment, the optical substrate 1 of has a predetermined processing area 10*a* which is selected from a curved recession surface along which to precisely form a uniform thickness of optical micro thin film 2 by ink jetting various ink-jetting speeds.

FIG. 4 shows a schematic side view of an optical lens structure having an optical micro thin film to form an optical pattern or a color design in accordance with a fourth preferred embodiment of the present invention; FIG. 5 shows a schematic top view of an optical lens structure having an optical micro thin film to form an optical pattern or a color design in accordance with the fourth preferred embodiment of the present invention. Turning now to FIGS. 4 and 5, in comparison with the first embodiment, the optical micro thin film 2 of the fourth preferred embodiment includes a first optical micro thin film and a second optical micro thin film which are piled up on the predetermined processing area 10 of the optical substrate 1.

With continued reference to FIGS. 4 and 5, by way of example, according to design needs, the optical micro thin film 2 is formed with a first micro thin film pattern 21*a* with a first color design and the optical micro thin film 2 is further formed with a second micro thin film pattern 21*b* with a second color design which may be similar to or different from that of first color design which are combined to form a composite micro thin film.

FIG. 6 is a schematic side view of an optical lens structure having an optical micro thin film to form an optical pattern or a color design in accordance with a fifth preferred embodiment of the present invention. Turning now to FIG. 6, in comparison with the first embodiment, the optical micro thin film 2 of the fifth preferred embodiment is provided to form a micro thin film pattern 21 (or color change distribution mark) which has various thicknesses to form a micro structure.

FIG. 7 is a schematic side view of an optical lens structure having an optical micro thin film to form an optical pattern or a color design in accordance with a sixth preferred embodiment of the present invention. Turning now to FIG. 7, in comparison with the first embodiment, the optical micro thin film 2 of the sixth preferred embodiment is provided to form a wavy-like micro thin film which is precisely controlled to have a uniform thickness.

Figure 8:
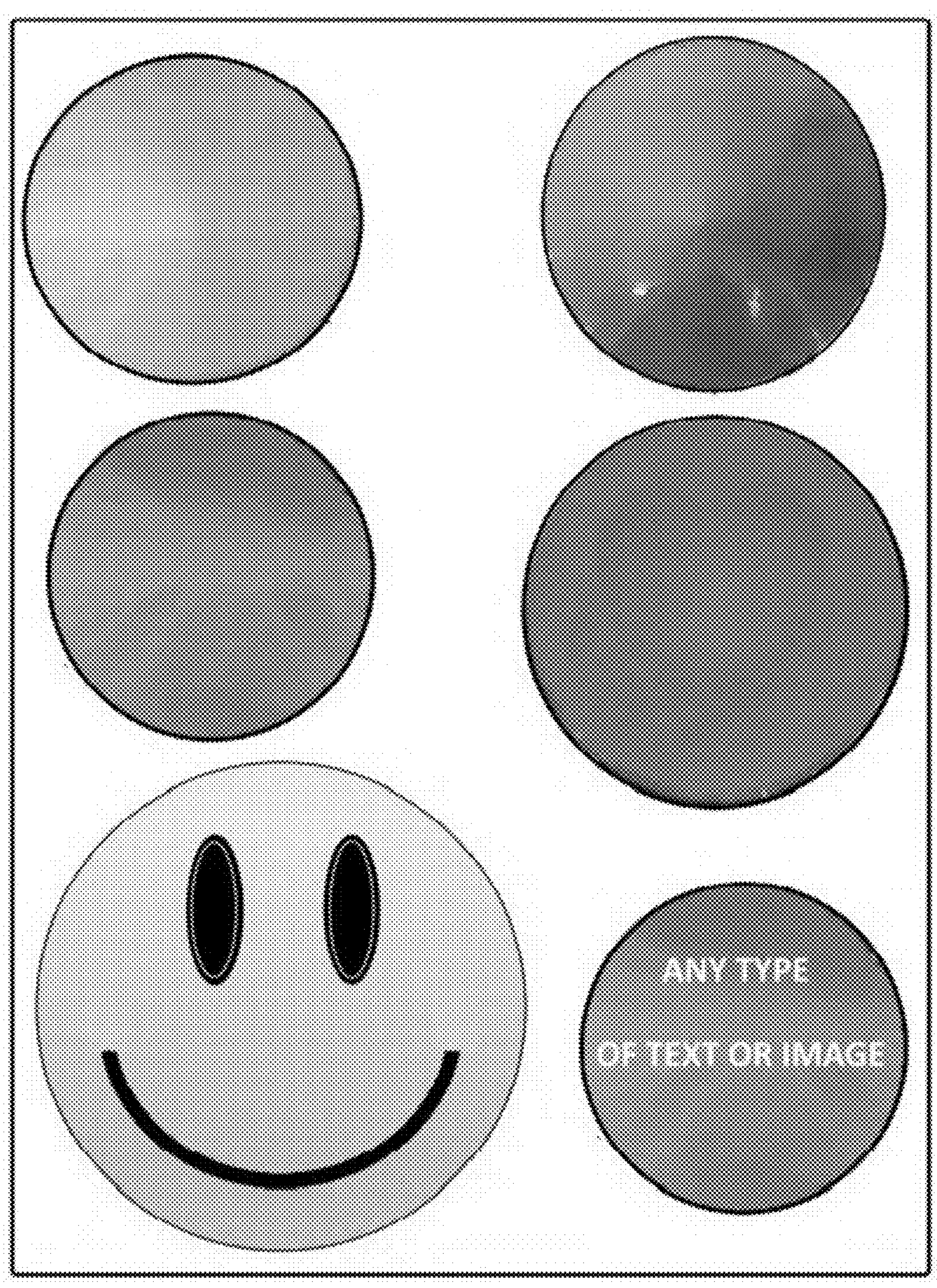
FIG. 8 is a series of front views of optical lens structure products in accordance with a preferred embodiment of the present invention.

FIG. 8 is a series of front views of optical lens structure products in accordance with a preferred embodiment of the present invention. Turning now to FIG. 8, six optical lens structure products are provided to have an optical micro thin film which forms a micro thin film pattern or a design of color change distribution mark.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. An optical lens structure comprising:

an optical substrate having a first surface and a second surface, with rays or a beam of light capable of penetrating through the first and second surfaces of the optical substrate;

at least one predetermined processing area provided on the first surface or the second surface of the optical substrate;

at least one ink-jetted optical micro thin film contactless formed with an ink droplet material processed by an ink-jetting nozzle procedure on the predetermined processing area of the first surface or the second surface of the optical substrate; and at least one predetermined, ink-jetted micro thin film pattern formed from the at least one ink-jetted optical micro thin film to thereby provide an optical characteristic on the first surface or the second surface of the optical substrate; wherein the at least one predetermined, ink-jetted micro thin film pattern is combined with another predetermined, ink-jetted color change distribution mark of ink-jetted optical micro thin film to be performed as a composite ink-jetted micro thin film.

2. The optical lens structure as defined in claim 1, wherein the optical substrate has a first refractive index and the ink-jetted optical micro thin film has a second refractive index relatively different from the first refractive index of the optical substrate.

3. The optical lens structure as defined in claim 1, wherein the first surface or the second surface of the optical substrate is selected from an irregularity surface, a curved surface, a wavy surface or combinations thereof.

4. The optical lens structure as defined in claim 1, wherein the ink-jetted optical micro thin film has a predetermined thickness ranging between 0.5 μm and 3.0 μm.

5. The optical lens structure as defined in claim 1, wherein the ink-jetted optical micro thin film comprises a plurality of ink-jetted micro thin films which are combined to form a composite ink-jetted micro thin film.

6. An optical lens structure comprising:

an optical substrate having a first surface and a second surface, with rays or a beam of light capable of penetrating through the first and second surfaces of the optical substrate;

at least one predetermined processing area provided on the first surface or the second surface of the optical substrate;

at least one ink-jetted optical micro thin film contactless formed with an ink droplet material processed by an ink-jetting nozzle procedure on the predetermined processing area of the first surface or the second surface of the optical substrate; and at least one predetermined, ink-jetted color change distribution mark formed from the at least one ink-jetted optical micro thin film to thereby provide an optical characteristic on the first surface or the second surface of the optical substrate; wherein the at least one predetermined, ink-jetted color change distribution mark is combined with another predetermined, ink-jetted micro thin film pattern of ink-jetted optical micro thin film to be performed as a composite ink-jetted micro thin film.

7. The optical lens structure as defined in claim 6, wherein the ink droplet material includes a plurality of dye materials which are continuously distributed to form the predetermined, ink-jetted color change distribution mark.

8. The optical lens structure as defined in claim 6, wherein the ink droplet material is processed to have various concentrations which are continuously distributed to form the predetermined, ink-jetted color change distribution mark.

9. The optical lens structure as defined in claim 6, wherein the predetermined, ink-jetted color change distribution mark is selected from a predetermined pattern, a predetermined symbol, a predetermined character, a predetermined number or combinations thereof.

10. The optical lens structure as defined in claim 6, wherein the predetermined, ink-jetted color change distribution mark is continuously formed with various thicknesses.

11. A manufacturing method for an optical lens structure comprising:

providing a predetermined processing area on a first surface or a second surface of the optical substrate;

contactless forming at least one ink-jetted optical micro thin film with jetting an ink droplet material in a non-contact precision process on the predetermined processing area of the first surface or the second surface of the optical substrate; and automatically forming at least one predetermined, ink-jetted micro thin film pattern or at least one predetermined, ink-jetted color change distribution mark from the ink-jetted optical micro thin film to thereby provide an optical characteristic on the first surface or the second surface of the optical substrate; wherein the at least one predetermined, ink-jetted micro thin film pattern is combined with another predetermined, ink-jetted color change distribution mark of ink-jetted optical micro thin film to be performed as a composite ink-jetted micro thin film; or wherein the at least one predetermined, ink-jetted color change distribution mark is combined with another predetermined, ink-jetted micro thin film pattern of ink-jetted optical micro thin film to be performed as a composite ink-jetted micro thin film.

12. The method as defined in claim 11, wherein the predetermined, ink-jetted micro thin film pattern or the predetermined, ink-jetted color change distribution mark is formed with arranging a series of micro ink spots one after another.

13. The method as defined in claim 11, wherein a series of first micro ink droplets and a series of second micro ink droplets can be controlled to provide a continuous change of thickness of the predetermined, ink-jetted micro thin film pattern or the predetermined, ink-jetted color change distribution mark.

14. The method as defined in claim 11, wherein a series of first micro ink droplets is processed to arrange on the first surface or the second surface of the optical substrate and a series of second micro ink droplets is processed to arrange on the first surface or the second surface of the optical substrate adjacent to the series of first micro ink droplets.

15. The method as defined in claim 11, wherein the predetermined processing area of the optical substrate is selected from a curved surface along which to precisely form a uniform thickness of ink-jetted optical micro thin film by various ink-jetting speeds.

16. The optical lens structure as defined in claim 1, wherein the ink droplet material is processed to have various concentrations which are continuously distributed to form the predetermined, ink-jetted color change distribution mark.

17. The optical lens structure as defined in claim 1, wherein the ink droplet material includes a plurality of dye materials which are continuously distributed to form the predetermined, ink-jetted color change distribution mark.

18. The optical lens structure as defined in claim 6, wherein the ink droplet material is processed to have various concentrations which are continuously distributed to form the predetermined, ink-jetted color change distribution mark.

19. The optical lens structure as defined in claim 6, wherein the ink droplet material includes a plurality of dye materials which are continuously distributed to form the predetermined, ink-jetted color change distribution mark.

20. The optical lens structure as defined in claim 6, wherein the optical substrate has a first refractive index and the ink-jetted optical micro thin film has a second refractive index relatively different from the first refractive index of the optical substrate.

* * * * *